(12) United States Patent
Hou et al.

(10) Patent No.: US 11,121,375 B2
(45) Date of Patent: Sep. 14, 2021

(54) SOLID-STATE ELECTRODES WITH NON-CARBON ELECTRONIC CONDUCTIVE ADDITIVES

(71) Applicant: GM GLOBAL TECHNOLOGY OPERATIONS LLC, Detroit, MI (US)

(72) Inventors: Mengyan Hou, Pudong (CN); Zhe Li, Pudong (CN); Dewen Kong, Minhang (CN); Haijing Liu, Shanghai (CN); Qili Su, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 42 days.

(21) Appl. No.: 16/159,799

(22) Filed: Oct. 15, 2018

(65) Prior Publication Data

US 2020/0119357 A1    Apr. 16, 2020

(51) Int. Cl.
| | |
|---|---|
| *H01M 4/62* | (2006.01) |
| *H01M 4/485* | (2010.01) |
| *H01M 4/38* | (2006.01) |
| *H01M 10/0525* | (2010.01) |
| *H01M 10/0562* | (2010.01) |
| *H01M 4/587* | (2010.01) |

(Continued)

(52) U.S. Cl.
CPC .......... *H01M 4/624* (2013.01); *H01M 4/382* (2013.01); *H01M 4/386* (2013.01); *H01M 4/405* (2013.01); *H01M 4/485* (2013.01); *H01M 4/505* (2013.01); *H01M 4/525* (2013.01); *H01M 4/587* (2013.01); *H01M 4/5825* (2013.01); *H01M 10/0525* (2013.01); *H01M 10/0562* (2013.01); *H01M 2300/0071* (2013.01)

(58) Field of Classification Search
CPC ...... H01M 4/382; H01M 4/386; H01M 4/405; H01M 4/505; H01M 4/525; H01M 4/5825; H01M 4/587; H01M 10/0525; H01M 10/0562
See application file for complete search history.

(56) References Cited

U.S. PATENT DOCUMENTS

| | | |
|---|---|---|
| 10,297,885 B2 | 5/2019 | Gayden et al. |
| 10,658,663 B2 | 5/2020 | Zhang et al. |

(Continued)

FOREIGN PATENT DOCUMENTS

| | | |
|---|---|---|
| CN | 111048825 A | 4/2020 |
| DE | 102019115643 A1 | 4/2020 |

*Primary Examiner* — Osei K Amponsah
(74) *Attorney, Agent, or Firm* — Harness, Dickey & Pierce, P.L.C.

(57) ABSTRACT

Individual electrodes for a solid-state lithium-ion battery cell may be formed, for example, by elevated temperature consolidation in air of a mixture of resin-bonded, electrode active material particles, oxide solid electrolyte particles, and particles of a non-carbon electronic conductive additive. Depending on the selected compositions of the electrode materials and the solid electrolyte, one or both of the cathode and anode layer members may be formed to include the non-carbon electronic conductive additive. The battery cell is assembled with the solid-state electrodes placed on opposite sides of a consolidated layer of oxide electrolyte particles. The electronic conductivity of at least one of the cathode and anode is increased by the incorporation of particles of a selected non-carbon electronic conducive additive with the respective electrode particles.

17 Claims, 4 Drawing Sheets

(51) Int. Cl.
H01M 4/505 (2010.01)
H01M 4/525 (2010.01)
H01M 4/58 (2010.01)
H01M 4/40 (2006.01)

(56) References Cited

U.S. PATENT DOCUMENTS

| | | | |
|---|---|---|---|
| 2015/0037688 A1* | 2/2015 | Otsuka | H01M 10/0562 429/322 |
| 2016/0043395 A1* | 2/2016 | Kawakami | H01M 4/131 429/322 |
| 2019/0157659 A1 | 5/2019 | Liu et al. | |

* cited by examiner

SOLID-STATE ELECTRODES WITH NON-CARBON ELECTRONIC CONDUCTIVE ADDITIVES

INTRODUCTION

Lithium-ion battery cells may be produced with solid-state electrodes and electrolytes. The range of potential compositions of their electrodes and electrolytes offer a wide range of electrochemical windows and relatively high temperature stability. But the electrode and electrolyte compositions also affect the electronic conductivity and power densities of the electrochemical cells.

SUMMARY

In accordance with practices of this disclosure, the electrodes of a solid-state lithium-ion battery are prepared to better utilize a combination of compacted and sintered particles of a suitable anode or cathode active material and particles of an oxide solid-state electrolyte. One or both of the particulate anode and cathode electrode mixtures is prepared to also contain a suitable proportion of particles of a non-carbon electronic conductive additive (NECA). The NECA additive is selected to provide a suitable improvement in the electronic conductivity of a proportioned mixture of ion-conducting anode or cathode particles and oxide solid-state electrolyte particles.

As an illustrative, non-limiting example, micrometer-size particles of spinel $LiNi_{0.5}Mn_{1.5}O_4$(LNMO) are useful as an active cathode material because they can be used to provide a high electrochemical voltage potential in a battery cell. The active cathode material particles of LNMO are combined with all-solid oxide electrolyte particles, for example, suitably, $Li_7La_3Zr_2O_{12}$, (LLZO), and with smaller particles of tin oxide, $SnO_2$ (as a NECA additive). The oxide solid electrolyte particles enhance ionic conductivity in and through the cathode material particles, and the tin oxide particles enhance electronic conductivity into and out of the cathode material. In accordance with practices of this disclosure, the NECA particles may combined with the cathode material particles and the solid electrolyte particles in different ways. Anode electrodes containing particles of anode active material, particles of an oxide solid electrolyte, and an NECA additive are prepared using like methods.

In a first method, micrometer-size (e.g., up to five μm in largest or characterizing dimension) tin oxide particles may simply be mixed with generally like-sized (or larger) particles of cathode active material and solid electrolyte material. The proportions of the respective components are determined to balance the electrochemical capacity of the electrode and cell, the ionic conductivity of the cell, and the electronic conductivity of the cell. The proportion of the NECA additive, when used, may be up to about fifty percent by weight of the combined electrode-electrolyte materials. Other components to increase the ionic conductivity or electronic conductivity of the mixture may be added.

A solution (or dispersion) of a suitable thermally-decomposable, carbon-based, binder may be added to the mixture of solid components, and the slurried mixture compacted and molded into a porous electrode layer of predetermined two-dimensional shape and thickness. The formed electrode layer shape is placed on one side of a densified, like-shaped, all solid-state oxide electrolyte body, such as a densified body of LLZO pellets. While supported on the LLZO solid electrolyte layer, the resin-bonded cathode layer is heated and sintered in air (for example) to form a more densified all solid-state cathode (or anode) bonded to one side of the solid electrolyte body. During the sintering step, the carbon-based binder solution (e.g., polyvinylidene difluoride dissolved in N-methyl-2-pyrrolidone) is vaporized, decomposed, and removed from the densified electrode body.

In a second method of forming the particulate mixture of cathode material, solid electrolyte, and NECA material; particles of the NECA material are coated onto particles of cathode material. The coating may be accomplished by, for example, the use of a removable organic binder to temporarily bond the particles of NECA material to the particles of cathode material. The NECA-coated cathode material particles are then mixed with oxide solid electrolyte particles preparatory to the formation of the resin-bonded cathode layer and its placement for sintering and further densification on the surface of an all-solid electrolyte layer or body. In some such coating practices, a solution of NECA precursors is prepared, deposited on particles of cathode material (or solid electrolyte particles), and the NECA composition formed on the surfaces of the electrode or electrolyte particles. In other NECA coating practices, atomic layer depositions may be formed on the surfaces of the particles of anode or cathode material. For example, titanium oxide particles were formed on the surfaces of LNMO cathode material particles in an atomic layer deposition process and reactor. Titanium tetraisopropoxide and water (as an oxidizer) were coated onto cathode material particles. The oxidation reaction was conducted at 90° C. to form the titanium oxide NECA material as a coating layer of desired thickness on the surfaces of the cathode particles.

In a third method of forming a particulate mixture of cathode material, solid electrolyte, and NECA material, suitably-sized particles of the selected NECA material are coated onto particles of solid electrolyte material. Suitable coating processes may be conducted as described in the above paragraph. Particles of NECA-coated, oxide solid electrolyte are then mixed with particles of cathode material before forming the molded, sintered, and densified body of cathode material on one side of a solid electrolyte layer.

The respective mixtures of solid anode and cathode materials are prepared separately with at least one of the electrodes containing a NECA composition, incorporated with the particulate electrode material and solid electrolyte material in accordance with one of the three above-described methods. A formed, resin-bonded particulate layer of cathode material is placed against one side of a solid electrolyte layer and sintered during the assembly of a lithium-ion battery cell. And a formed, resin-bonded particulate layer of anode material is placed against the opposite side of the solid electrolyte layer and sintered as part of the assembly of the battery cell. A suitable current collector member is bonded to the opposing side of the sintered anode layer and a current collector is bonded to the opposing side of the sintered cathode layer to further the assembly of the all solid-state battery cell.

For example, an aluminum current collector (possibly an aluminum foil) may be bonded to one side of the LNMO cathode active material for the battery cell. The LNMO cathode active material and the LLZO solid electrolyte provide for conductivity of lithium ions into and out of the cathode during cycling of the battery cell. And the tin oxide provides enhanced electronic conductivity between the cathode and its current collector.

As suggested in the above text, a battery anode layer may be prepared in a similar manner using, for example, particles of lithium titanium oxide ($Li_4Ti_5O_{12}$, LTO) as the anode active material for the battery cell. The LTO particles may be combined with LLZO solid electrolyte particles and SnO or SnO$_2$ particles in accordance with one of the three above-described methods of incorporating NECA material into a porous electrode in accordance with this invention. A copper current collector (for example) may be attached or bonded to the other side of the anode layer.

As described in this example, a substantially fully densified layer of solid electrolyte (e.g., LLZO) is provided for face-to-face placement and bonding between the anode and cathode electrode layers as they are formed. In this example, both the anode and cathode battery electrodes are composed of particles of (i) an oxygen-containing, solid electrolyte of ionic conductivity and particles of (ii) a non-carbon electronic conductor (NECA) to enhance the power performance of the battery cell. And in this example. the NECA additive (here a tin oxide) was added to both the anode and cathode. In other selected electrode material combinations, it may be sufficient to use the NECA component in only one of the anode or cathode electrodes for the lithium-ion battery cell.

In the following detailed description portion of this specification, listings of additional materials are provided for active anode compositions, active cathode compositions, oxide solid-state electrolytes and non-carbon electronic conductive additives.

Other objects and advantages of this disclosure and invention will be apparent from the following portions of the specification.

BRIEF DESCRIPTION OF THE DRAWINGS

In the embodiment illustrated in FIG. 3, the cathode layer is formed of a compacted and sintered layer of a mixture of particles of cathode active material (e.g., spinel LiNi$_{0.5}$Mn$_{1.5}$O$_4$ particles), oxide solid-state electrolyte particles, (e.g., Li$_7$La$_3$Zr$_2$O$_{12}$ particles), and non-carbon electronic conductive particles (e.g. tin oxide particles). And the anode layer is formed of a compacted and sintered layer of particles of anode active material (e.g., Li$_4$Ti$_5$O$_{12}$ particles), like-composed solid-electrolyte particles, and like-composed non-carbon electronic conductive particles. Thus, in the FIG. 3 embodiment, both the cathode and anode compositions include a non-carbon electronic conductive additive.

DETAILED DESCRIPTION

The use of solid-state electrode materials and oxide solid-state electrolytes (including phosphate-containing electrolytes) can enable both high temperature stability and high operating voltages in lithium-ion batteries. However, the preparation of the solid-state electrodes and electrolyte often require compaction of particles of electrode and electrolyte materials at a high temperature (but below their melting points). The use of carbon or carbon-containing electrode or electrolyte materials in making such electrodes and electrolyte layers may be difficult or expensive because the carbon is often oxidized in manufacturing processes in air. Accordingly, this disclosure is directed to the preparation of electrodes and oxide solid-state electrolyte layers for lithium-ion batteries which do not use a significant proportion of elemental carbon. And a suitable solid non-carbon electronic conductive additive is incorporated with either or both of the non-carbon, cathode active materials and the non-carbon, active anode materials employed in the functioning lithium-ion battery cell.

Suitable cathode materials may, for example, be selected from:

(a) Rock salt layered oxides, e.g. LiCoO$_2$, LiNi$_x$Mn$_y$Co$_{1-x-y}$O$_2$, LiNi$_x$Mn$_{1-x}$O$_2$, Li$_{1+x}$MO$_2$, etc.

(b) Spinel cathode, e.g. $LiMn_2O_4$, $LiNi_xMn_{2-x}O_4$ (c) Polyanion cathode, (a) phosphate, e.g. $LiV_2(PO_4)_3$ etc., (b) Silicate, e.g. $LiFeSiO_4$ (d) Coated and/or doped cathode materials mentioned in (a), (b) and (c).

Suitable anode materials in the all-solid-state batteries of this disclosure may, for example, be selected from:

(a) Lithium titanium oxide, e.g. $Li_4Ti_5O_{12}$, metal oxide (e.g., $V_2O_5$ and the likes), metal sulfide (e.g., FeS and the like) and so on (b) Li metal and Li alloy (c) Si and Silicon-alloy (d) Carbonaceous anode, e.g. carbon nanotubes, graphite, graphene Suitable oxide solid-state electrolyte materials in the all-solid-state batteries of this disclosure may, for example, be selected from:

(a) Garnet type, e.g. $Li_7La_3Zr_2O_{12}$, $Li_5La_3M_2O_{12}$ (M=Nb or Ta;

(b) LISICON type, e.g. $Li_{14}Zn(GeO_4)_4$, $Li_{3+x}(P_{1-x}Si_x)O_4$;

(c) NASICON type, e.g. $Li_{1+x}Al_xGe_{2-x}(PO_4)_3$ (LAGP), $Li_{1+x}Ti_{2-x}Al_x(PO_4)_3$ (LTAP), $LiTi_{0.5}Zr_{1.5}(PO_4)_3$;

(d) Perovskite type, e.g. $Li_{3.3}La_{0.56}TiO_3$, $Li_{3x}La_{2/3-x}TiO_3$, $Li_{0.5}M_{0.5}TiO_3$ (M=Sm, Nd, Pr, and La).

And examples of suitable non-carbon electric conductive (NECA) materials for use in the all-solid-state batteries of this disclosure include one or a combination of:

(a) Oxides, (a) simple oxides, e.g. $RuO_2$, $SnO_2$, $Ti_2O_3$, ZnO, $Ge_3O_3$ (b) superconductive oxides: $YBa_2Cu_3O_7$, $La_{0.75}Ca_{0.25}MnO_3$ (b) Carbides, e.g. $SiC_2$ (c) Silicides, e.g. $MoSi_2$ (d) Sulfide, e.g. $CoS_2$.

(e) Modified substances of the above mentioned, e.g. doped and coated.

(f) Metals such as Ag, Au, Cu, Pd, and Pt, as well as alloys or composites of such metals.

In general, the average diameter or characterizing diameter of the NECA material is five micrometers or smaller. In electrodes in which the NECA material is incorporated, it may constitute up to about fifty percent by weight of the overall mixture of electrode material, oxide solid-state electrolyte material and NECA material. The NECA material may be used in various morphologies including for example, regularly or irregularly shaped particles, tubes, belts, thorns, shells, and wires.

And NECA materials may be used to improve electronic conductivity in electrodes in combination with solid-state electrolytes (SSEs) other than oxide solid-state electrolytes. One or more of the above-listed NECA materials may be used with (a) Sulfide SSEs, e.g. $Li_{10}GeP_2S_{12}$, $Li_3PS_4$ etc.;

(b) Hydride SSEs, e.g. $Li_3AlH_6$ etc.;

(c) Halide SSEs, e.g. LiI, $Li_2ZnI_4$, $Li_3OCl$;

(d) Borate SSEs, e.g. $Li_2B_4O_7$, $Li_2O—B_2O_3—P_2O_5$;

(e) Nitride SSEs, e.g. LiPON;

(f) Polymer, e.g. PEO

The choice of a specific combination of a cathode active lithium-ion battery material, anode material, solid electrolyte material, and non-carbon electronic conductive additive will be based on the intended function, energy requirements, power requirement, and manufacturing cost of the intended cell or groupings of cells of which the battery is to be composed.

Figure 1:
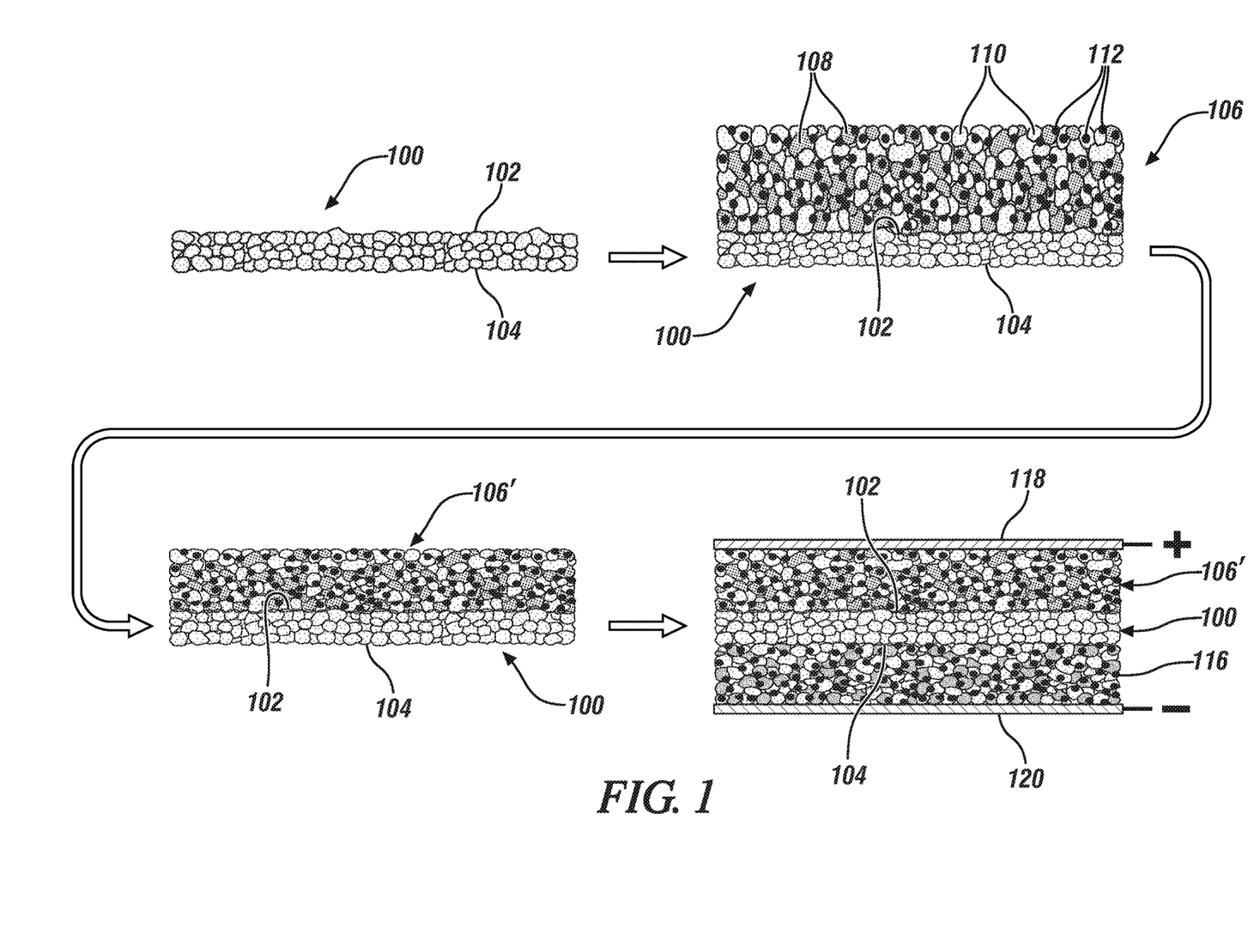
FIG. 1 is an enlarged schematic flow diagram of a method for forming a densified all solid-state electrode layer on a dense layer of solid oxygen-containing electrolyte particles. The two layers are of like two-dimensional shape. For example, a suitably thick or viscous slurry, composed of binder, cathode material, oxide solid state electrolyte particles, and a NECA material, dispersed in a solvent is deposited on one side of a dense solid layer of oxide solid electrolyte particles and the two layers heated in air to decompose (if necessary) and remove the binder and to sinter and densify the cathode layer. A like-shaped, sinter-densified, anode layer is subsequently formed on and bonded to the other side of the oxide solid electrolyte layer. The assembly of the cell is completed by the attachment of a suitable current collector on the outside surfaces of each of the sinter-densified, particulate cathode and anode layers.

In accordance with an illustrative, non-limiting practice of this invention, solid state electrodes and an oxide-solid-state electrolyte for a lithium-ion battery cell may be prepared and assembled as follows. Reference may be had to the schematic process flow-diagram presented in FIG. 1. In FIG. 1 the members of the cell are illustrated in an enlarged, side-elevational view. Each of the cell members is rectangular in two-dimensional or plan view, but only the side edges are seen in FIG. 1.

An oxide solid-state electrolyte layer 100 (of exaggerated thickness for purpose of illustration) is formed of a hot-pressed, densified layer of, for example, $Li_7La_3Zr_2O_{12}$ (LLZO) pellets. The major opposing sides 102, 104 of oxide solid-state electrolyte layer 100 serve as platforms and bonding surfaces for the formation of the solid-state cathode and anode layers to be formed. In the second illustrated step of FIG. 1, a porous, carbon-based, resin-bonded layer of cathode material 106 is formed on the upper surface 102 of the oxide solid-state electrolyte layer 100. A suitably viscous coating slurry made by dispersing a binder, solid state electrolyte particles, a NECA, and cathode material is deposited as a coating on the upper surface 102. The solvent is evaporated by heating the dispersion in air. In this illustration, the porous, resin-bonded layer of cathode material is formed of a mixture of particles of active cathode material 108 (organized dark dots), particles of solid electrolyte 110 (light particles), and NECA particles (dark circles) 112. In the third illustrated step of FIG. 1, the combination of the porous coating layer of cathode material 106 carried on the solid-state electrolyte layer 100 were subjected to a sintering temperature in air. At the conclusion of the sintering step, a densified solid-state cathode 106' was formed with good interfacial contact with the upper surface 102 of solid electrolyte 100. The opposite surface 104 of solid electrolyte layer 100 remains available for placement of a layer of anode material to be placed on it and bonded to it in a like method.

The above process was practiced again to place a porous layer of anode material on opposing surface 104 of the (then inverted) solid electrolyte layer 100. And the combination of electrode layers and solid state electrolyte 100 subjected to a second co-sintering operation. As depicted in the fourth schematic illustration in FIG. 1, a cell assembly is depicted to now contain a densified, solid-state anode layer 116 compacted and thermally bonded on the opposing side 104 of the oxide solid-state electrolyte layer 100. The solid-state anode layer was formed of a densified mixture of particles of anode material (random dots), particles of solid electrolyte (light particles) and NECA particles (round dark circles). Current collector 118 (+charged) was placed against the opposite side of the densified cathode layer 106' and current collector 120 (−charged) was placed against the opposite side of densified anode layer 116 to further the assembly of a lithium-ion battery cell.

In the electrode formation and battery cell assembly process illustrated in FIG. 1, the particles of NECA material were simply mixed separately with particles of the respective cathode or anode materials and the solid electrolyte particles. This practice of incorporating NECA particles with electrode particles and electrolyte particles is illustrated in the enlarged view of FIG. 2C. But the NECA particles may also be incorporated in solid state electrode members in different ways.

Figure 2A:
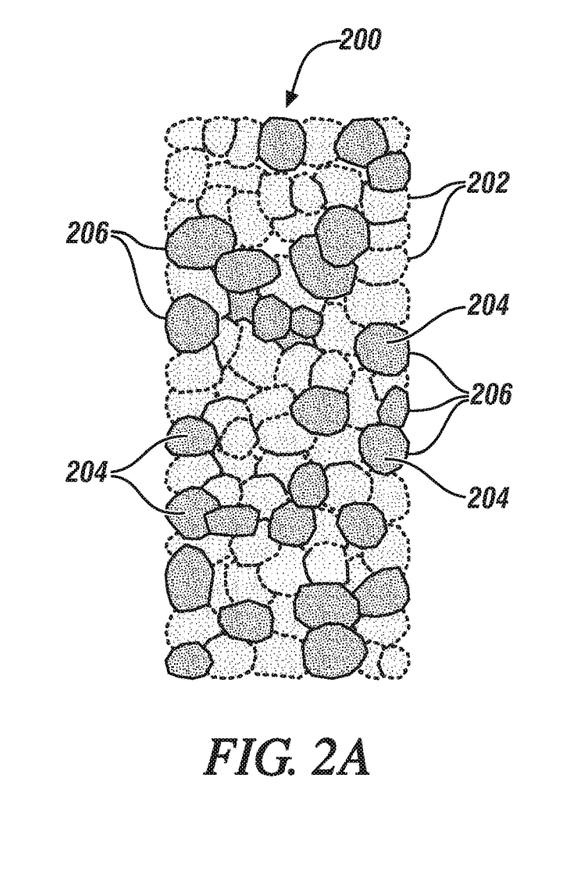
FIGS. 2A-2C are side-edge enlarged schematic views of individual, representative solid-state electrodes formed of sinter-densified mixtures of electrode particles, oxide solid electrolyte particles, and non-carbon electronic conductive additive particles (NECA). In the embodiment of FIG. 2A, the NECA particles are pre-coated on the particles of electrode material and the NECA-coated particles of electrode material are mixed with particles of oxide-based solid electrolyte. In the embodiment of FIG. 2B, the NECA particles are pre-coated on the oxide solid electrolyte particles and the NECA-coated solid electrolyte particles are mixed with the particles of electrode material. And in the embodiment of FIG. 2C, the three-component electrode layer is formed of a sinter-densified layer of a mixture of particles of electrode material, oxide solid-electrolyte material, and NECA material.
Figure 2B:
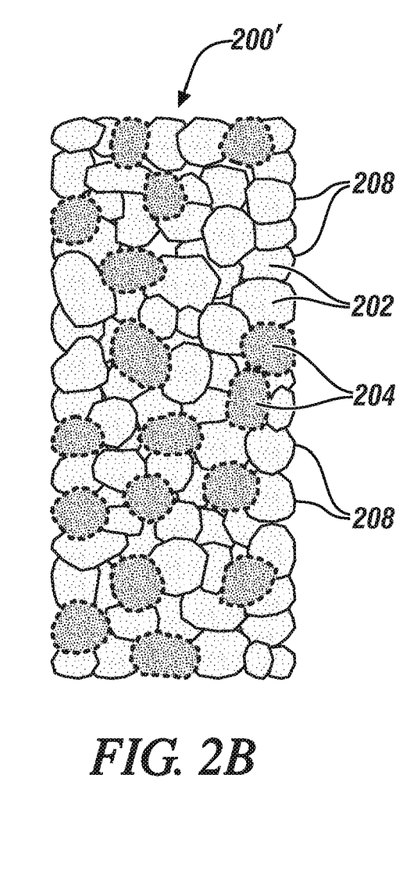
Figure 2C:
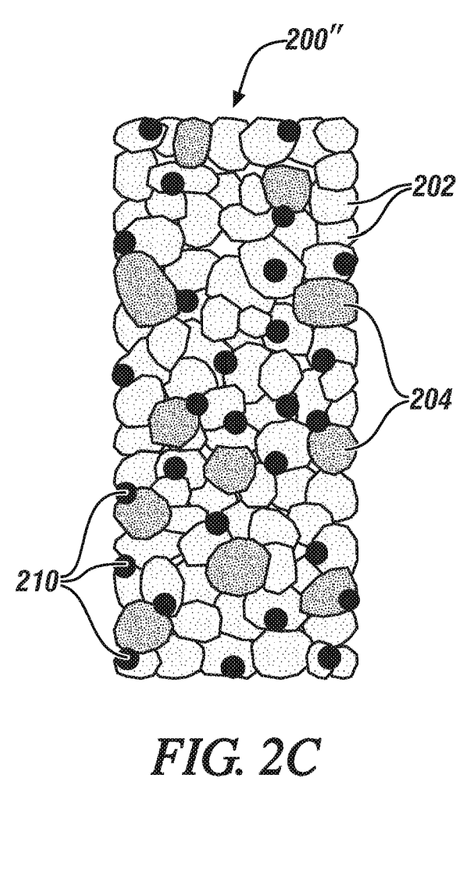

The enlarged, schematic illustrations of compacted and sinter-densified solid electrodes of FIGS. 2A, 2B, and 2C are side-edge views of rectangular electrodes formed of a mixture of electrode material particles, oxide solid electrolyte particles, and NECA particles. The NECA particles are incorporated into the electrode mixtures in different ways in the three Figures.

In the illustration of FIG. 2A, the NECA particles are coated by a suitable practice (e.g., resin bonding or atomic layer deposition) on the surfaces of the particles of electrode materials. The sintered electrode member 200 is formed from individual oxide solid state electrolyte particles (dashed-line edges or surfaces) 202 and particles of electrode material 204, which have each been coated with NECA particles, schematically indicated by the dark, solid line bands 206 on the external surfaces of the electrode particles 204. In this embodiment of the disclosure, the NECA particles (bands, 206) are closely associated with the underlying solid electrode particles 204. In the forming of a cathode, electrode particles 204 would, of course, be particles of active cathode material. In an anode they would be particles of active anode material.

The coating of NECA particles on the surfaces of the particles of electrode materials is suitably accomplished (for example) by slurrying small NECA particles in a solution of a binder resin and mixing them with particles of electrode material. The mixture is heated to evaporate the solvent and to produce a coated bond of NECA particles on the surfaces of the particles of electrode material. The NECA particle-coated electrode material particles are then mixed with particles of the solid electrolyte.

In FIG. 2B, the solid-state electrode 200' is formed with the NECA particles coated by a suitable resin-bonding practice on the surfaces of the particles of the solid electrolyte materials 202. In this embodiment the NECA particles are indicated as dark solid-line bands 208 on the surfaces of the electrolyte particles 202 in this two-dimensional illustration. Electrode particles 204 (illustrated with uncoated dashed line edges) are mixed with the NECA-coated 208, solid electrolyte particles 202.

In the embodiment of FIG. 2C, the solid state electrode 200" is formed of a mixture of individual oxide solid-state electrolyte particles 202, solid particles of electrode material (one of anode or cathode material) 204, and particles 210 of a suitable, selected NECA material.

Thus, depending on the required, enhanced electronic conduction properties of the battery cell, the addition of NECA particles may be accomplished in any one or combination of the practices illustrated in FIGS. 2A, 2B, and 2C.

Figure 3:
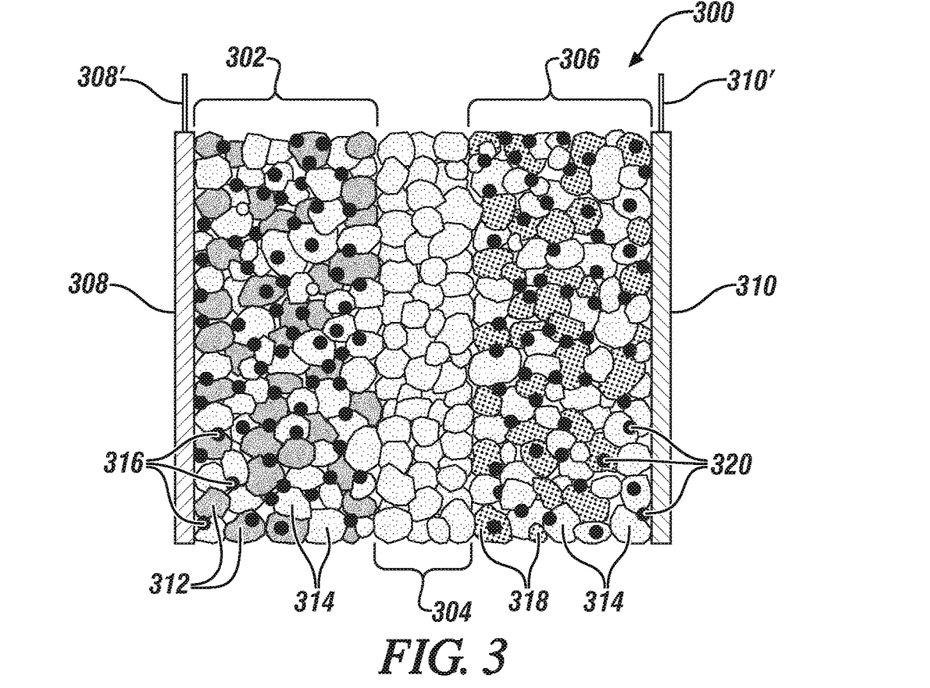
FIG. 3 is an enlarged schematic cross-sectional view of the side edges of one cell of a layered, solid-state lithium-ion battery comprising, from left-to-right, an aluminum current collector carrying a particulate layer of cathode active material, an oxide solid electrolyte layer, and a particulate layer of anode active material bonded to a copper current collector. The respective cathode, solid electrolyte, and anode layers have like, generally co-extensive, rectangular shapes which are not visible in the cross-sectional side edge view of FIG. 3.
Figure 4:
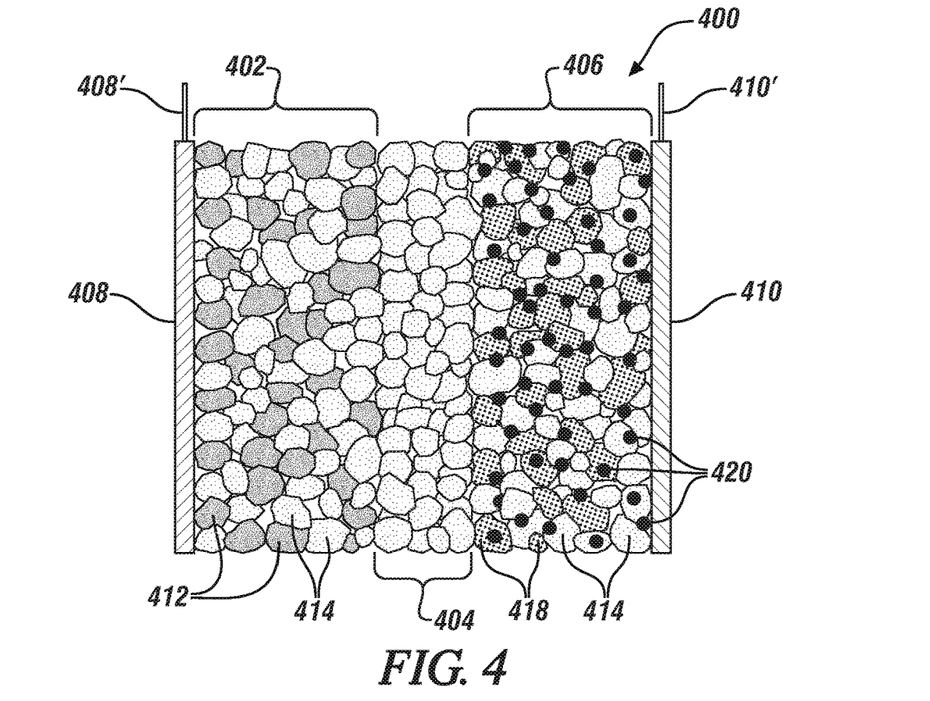
FIG. 4 is an enlarged schematic cross-sectional view (similar to FIG. 3) of the side edges of one cell of a solid-state lithium-ion battery comprising, from left-to-right, an aluminum current collector carrying a particulate layer of active cathode material, an oxide solid-state electrolyte layer, and a particulate layer of active anode material bonded to a copper current collector. The respective cathode, solid-state electrolyte, and anode layers have like rectangular shapes which are not visible in the cross-sectional view of FIG. 4. In the embodiment of the disclosure illustrated in FIG. 4, the layer of cathode material does not contain a NECA component.
Figure 5:
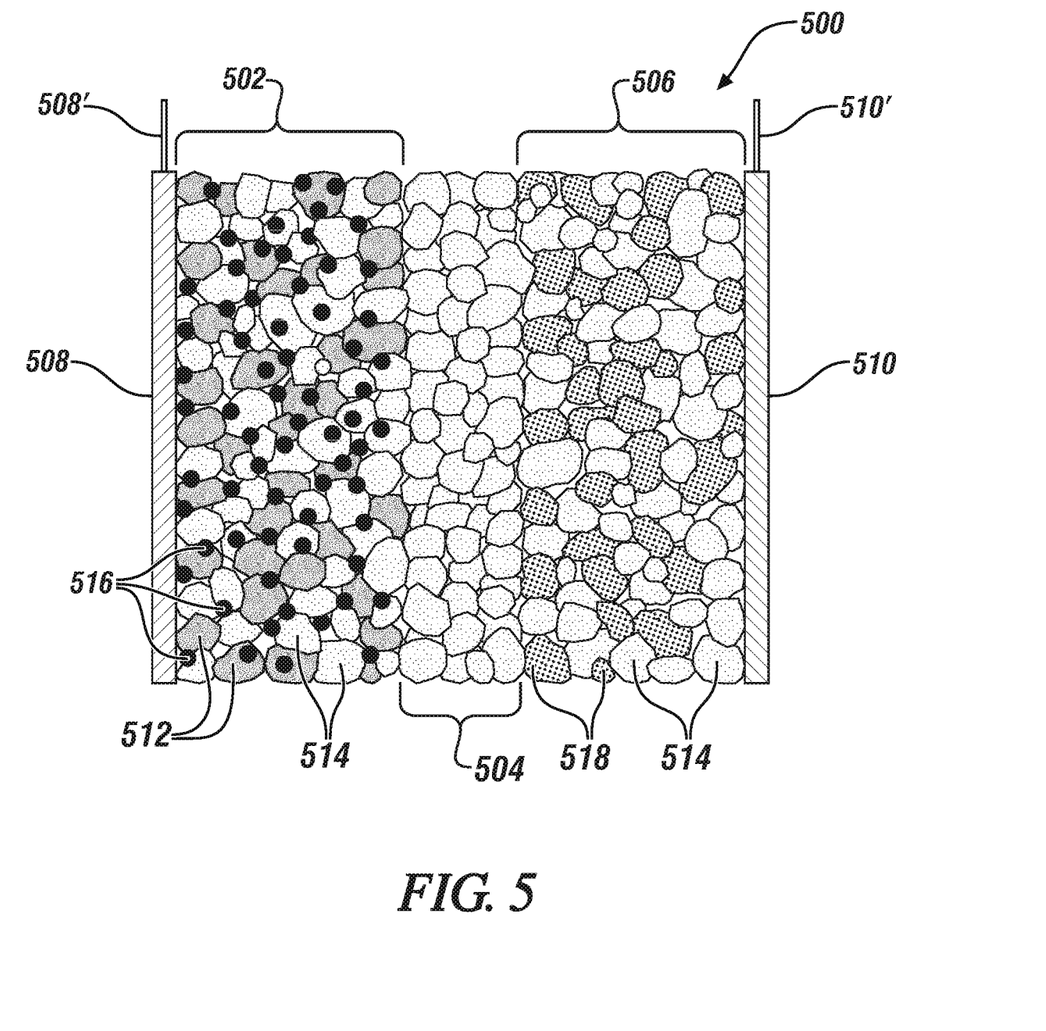
FIG. 5 is an enlarged schematic cross-sectional view (similar to FIG. 3) of the side edges of one cell of a solid-state lithium-ion battery comprising, from left-to-right, an aluminum current collector carrying a particulate layer of active cathode material, a solid-state electrolyte layer, and a particulate layer of active anode material bonded to a copper current collector. The respective cathode, solid electrolyte, and anode layers have like rectangular shapes which are not visible in the cross-sectional view of FIG. 5. In the embodiment of the disclosure illustrated in FIG. 5, the layer of anode material does not contain a NECA component.

In the illustrations of lithium-ion battery cells as presented in FIGS. 3-5 different practices are illustrated for using the NECA particles in a cathode or anode of a lithium-ion battery cell.

And the use of NECA particles can be varied in additional ways in accordance with the following illustrations of FIGS. 3-5.

With reference to FIG. 3, an enlarged, schematic, cross-sectional view of the side edges of a single solid-state lithium-ion battery cell 300 is presented. Lithium-ion battery cell 300 comprises a solid-state cathode layer 302, a solid electrolyte layer 304 and a solid state anode layer 306. In an exemplary solid-state lithium-ion battery cell (such as cell 300), the solid-state cathode layer 302 may be rectangular in two-dimensional shape with a generally uniform thickness. The size of the cathode is based on its intended contribution to the electrochemical energy and power output of the cell. The thickness of the layer of cathode material 302 is generally in a range up to about 1000 micrometers.

One major side-surface of solid-state cathode layer 302 is attached to a major face of a like-shaped, chemically and electrically compatible metallic current collector 308 (possibly an aluminum foil). The nature of the interfacial contact between cathode layer 302 and current collector 308 is such that electrons can readily flow between the cathode battery material of cathode 302 and current collector 308. Current collector 308 may have a tab 308' at one of its sides for electrical connection to external electrical load-requiring members, battery charging members, or to other electrodes of a grouping of battery cells in an assembled multicell battery structure. The thickness of current collector 308 is sometimes in the range of about five to 25 micrometers. In a grouping of battery cells, a layer of cathode material, like or compatible with cathode layer 302, would be attached to the other side or face of solid-state current collector 308.

The other major face of solid-state cathode layer 302 is bonded against one major side or face of solid electrolyte layer 304. Solid electrolyte layer 304 is shaped to co-extensively overlie the face surfaces of both solid-state cathode layer 302 and solid-state battery anode layer 306.

Solid-state anode layer 306 has a rectangular shape corresponding to that of solid-state cathode layer 302. As illustrated in FIG. 3, one side of anode layer 306 fits closely against one side of solid electrolyte layer 304 and the other side of anode layer is attached face-to-face against a side of current collector 310 (often a copper current collector).

The nature of the interfacial contact between anode layer 306 and current collector 310 is such that electrons can readily flow between the anode battery material of anode 306 and current collector 310. Current collector may have a tab 310' at one of its sides for electrical connection to external members powered by the cell, charging members for the cell, or to other electrodes of a grouping of battery cells in an assembled multicell battery structure. The thickness of current collector 310 is typically in the range of about five to 25 micrometers. In a grouping of battery cells, a layer of anode material, like or compatible with anode layer 306, would be attached to the other side or face of solid-state current collector 310.

In the embodiment of FIG. 3 lithium-ion battery cathode layer 302 is formed of a compacted and sintered mixture of particles of a suitable active cathode material 312 (e.g., spinel $LiNi_{0.5}Mn_{1.5}O_4$ particles), solid-electrolyte particles 314, (e.g., $Li_7La_3Zr_2O_{12}$ particles), and non-carbon electronic conductive particles 316 (e.g. tin oxide particles). The particulate mixture of the three components of the cathode active material layer 302 are suitably compacted and sintered to form a suitably strong cathode layer (which may have some residual porosity) for assembly in lithium-ion battery cell 300 and cyclic operation during cycling of the battery cell 300.

Solid electrolyte layer 304 will typically, but not necessarily always, be formed of substantially fully consolidated particles of the same composition as the particulate solid electrolyte constituent of the cathode layer 302 and anode layer 306. Accordingly, solid electrolyte layer 304 is suitably formed of hot pressed $Li_7La_3Zr_2O_{12}$ particles.

Anode layer 306 is formed of a compacted and sintered layer of particles of active anode material (e.g., $Li_4Ti_5O_{12}$ particles), like-composed solid-electrolyte particles (e.g., $Li_7La_3Zr_2O_{12}$), and like-composed non-carbon electronic conductive particles (tin oxide). As stated, one side of anode layer 306 lies against current collector 310 and the bond between the electrode 306 and current collector 310 enables the flow of electrons across the interfacial bond. The size (the amounts of constituents) of the anode layer is determined by its role in the capacity of the lithium-ion battery cell. The thickness of the layer of anode material 306 is generally in a range up to about 1000 micrometers.

FIG. 4 illustrates a second embodiment of the disclosure and invention in which only the anode layer contains non-carbon electronic conductive particles. In this embodiment, particles of $Li_4Ti_5O_{12}$ may serve as anode material, particles of $LiV_2(PO_4)_3$ as cathode material, $Li_{1.3}Al_{0.3}Ti_{0.7}(PO_4)_3$ as solid electrolyte, and $YBaCuO_7$ as the NECA material.

In FIG. 4, a cross-sectional view of the side edges of a single solid-state lithium-ion battery cell 400 is presented. Lithium-ion battery cell 400 comprises a solid-state cathode layer 402, a solid electrolyte layer 404 and a solid state anode layer 406. The solid-state cathode layer 402 may be rectangular in two-dimensional shape with a generally uniform thickness. The size of the cathode is based on its intended contribution to the electrochemical energy and power output of the cell. The thickness of the layer of cathode material 402 is generally in a range up to about 1000 micrometers.

One major side-surface of solid-state cathode layer 402 is attached to a major face of a like-shaped, chemically and electrically compatible metallic current collector 408. The nature of the interfacial contact between cathode layer 402 and current collector 408 is such that electrons can readily flow between the cathode battery material of cathode 402 and current collector 408. Current collector 408 may have a tab 408' at one of its sides for electrical connection to other electrodes of a grouping of battery cells in an assembled multicell battery structure. The thickness of current collector 408 is typically in the range of about five to 25 micrometers. In a grouping of battery cells, a layer of cathode material, like or compatible with cathode layer 402, would be attached to the other side or face of solid-state current collector 408.

The other major face of solid-state cathode layer 402 is placed against one major side or face of solid electrolyte layer 404. Solid electrolyte layer 404 is shaped to co-extensively overlie the face surfaces of both solid-state cathode layer 402 and solid-state battery anode layer 406. The thickness of solid electrolyte layer is predetermined to provide a suitable supply of lithium cations and corresponding anions between solid-state cathode layer 402 and solid-state anode layer 406.

Solid-state anode layer 406 has a rectangular shape corresponding to that of solid-state cathode layer 402. The thickness of anode layer 406 is determined to provide a suitable amount of active anode material to function in combination with cathode layer 402 in the discharging and re-charging of solid-state lithium-ion battery 400. As illustrated in FIG. 4, one side of anode layer 406 fits closely against one side of solid electrolyte layer 404 and the other side of anode layer is attached face-to-face against a side of current collector 410.

In the embodiment of FIG. 4 lithium-ion battery cathode layer 402 is formed of a compacted and sintered mixture of particles of a suitable active cathode material 412 and solid-electrolyte particles 414, but no non-carbon electronic conductive particles. The particulate mixture of the two components of the cathode active material layer 402 are suitably compacted and sintered to form a suitably strong cathode layer (which may have some residual porosity) for assembly in lithium-ion battery cell 400 and cyclic operation during cycling of the battery cell 400.

Solid electrolyte layer 404 will typically, but not necessarily always, be formed of substantially fully consolidated particles of the same composition as the particulate solid electrolyte constituent 414 of the cathode layer 402 and anode layer 406.

Anode layer 406 is formed of a compacted and sintered layer of particles of active anode material 418, solid-electrolyte particles 414, and non-carbon electronic conductive particles 420. As stated, one side of anode layer 406 lies against current collector 410 and the bond between the electrode 406 and current collector 410 enables the flow of electrodes across the interfacial bond. The size (the amounts of constituents) of the anode layer is determined by its role in the capacity of the lithium-ion battery cell. The thickness of the layer of anode material 406 is generally in a range up to about 1000 micrometers.

FIG. 5 illustrates a third embodiment of the disclosure and invention in which cathode layer contains non-carbon electronic conductive particles. In this embodiment of the disclosure a suitable cathode material is particles of $LiCoO_2$, lithium metal is a suitable anode material, $Li_{1.5}Al_{0.5}Ge_{1.5}(PO_4)_3$ is a suitable solid electrolyte, and $RuO_2$ is a suitable NECA additive.

In FIG. 5, a cross-sectional view of the side edges of a single solid-state lithium-ion battery cell 500 is presented. Lithium-ion battery cell 500 comprises a solid-state cathode layer 502, a solid electrolyte layer 504 and a solid state anode layer 506. The solid-state cathode layer 502 may be rectangular in two-dimensional shape with a generally uniform thickness. The size of the cathode is based on its intended contribution to the electrochemical energy and power output of the cell. The thickness of the layer of cathode material 502 is generally in a range up to about 1000 micrometers.

One major side-surface of solid-state cathode layer 502 is attached to a major face of a like-shaped, chemically and electrically compatible metallic current collector 508. The nature of the interfacial contact between cathode layer 504 and current collector 508 is such that electrons can readily flow between the cathode battery material of cathode 502 and current collector 508. Current collector 508 may have a tab 508' at one of its sides for electrical connection to other electrodes of a grouping of battery cells in an assembled multicell battery structure. The thickness of current collector 508 is typically in the range of about five to 25 micrometers. In a grouping of battery cells, a layer of cathode material, like or compatible with cathode layer 502, would be attached to the other side or face of solid-state current collector 508.

The other major face of solid-state cathode layer 502 is placed against one major side or face of solid electrolyte layer 504. Solid electrolyte layer 504 is shaped to co-extensively overlie the face surfaces of both solid-state cathode layer 502 and solid-state battery anode layer 506. The thickness of solid electrolyte layer is predetermined to provide a suitable supply of lithium cations and corresponding anions between solid-state cathode layer 502 and solid-state anode layer 506.

Solid-state anode layer 506 has a rectangular shape corresponding to that of solid-state cathode layer 502. The thickness of anode layer 506 is determined to provide a suitable amount of active anode material to function in combination with cathode layer 502 in the discharging and re-charging of solid-state lithium-ion battery 500. As illustrated in FIG. 5, one side of anode layer 506 fits closely against one side of solid electrolyte layer 504 and the other side of anode layer is attached face-to-face against a side of current collector 510.

In the embodiment of FIG. 5 lithium-ion battery cathode layer 502 is formed of a compacted and sintered mixture of particles of a suitable active cathode material 512, solid-electrolyte particles 514, and non-carbon electronic conductive particles 516. The particulate mixture of the three components of the cathode active material layer 502 are suitably compacted and sintered to form a suitably strong cathode layer (which may have some residual porosity) for assembly in lithium-ion battery cell 500 and cyclic operation during cycling of the battery cell 500.

Solid electrolyte layer 504 will typically, but not necessarily always, be formed of substantially fully consolidated particles of the same composition as the particulate solid electrolyte constituent 514 of the cathode layer 502 and anode layer 506.

Anode layer 506 is formed of a compacted and sintered layer of particles of active anode material 518, and solid-electrolyte particles 514, but no non-carbon electronic conductive particles. As stated, one side of anode layer 506 lies against current collector 510 and the bond between the electrode 506 and current collector 510 enables the flow of electrodes across the interfacial bond. The size (the amounts of constituents) of the anode layer is determined by its role in the capacity of the lithium-ion battery cell. The thickness of the layer of anode material 506 is generally in a range up to about 1000 micrometers.

The above text is intended to provide non-limiting examples of practices to the disclosed embodiments for preparing electrodes for a wholly solid-state lithium-ion battery. But these illustrative examples are not limitations on the scope of the disclosure or of the scope of the following claims.

The invention claimed is:

1. A solid-state electrode for a lithium-ion battery cell in which a solid-state anode layer is placed against a surface of an oxide solid-state electrolyte layer and a solid-state cathode layer is placed against the opposing surface of the oxide solid-state electrolyte layer, each of the solid-state anode layer and the solid-state cathode layer having a current collector attached to their sides opposite to the oxide solid-state electrolyte layer, the oxide solid-state electrolyte layer consisting essentially of an oxide, phosphate, or silicate of lithium and at least one other metal element, the oxide solid-state electrolyte being conductive of lithium cations and compatible anions in the discharging and re-charging of the lithium-ion battery cell, the solid-state electrode comprising:
a densified prepared mixture of particles of a lithium-ion-accepting and lithium-ion-releasing electrode composition, particles of the oxide solid-state electrolyte layer composition, particles of a non-carbon electronic conductive additive selected from the group consisting of: $Ge_2O_3$, $RuO_2$, $SnO_2$, $Ti_2O_3$, $ZnO$, $YBa_2Cu_3O_7$, $La_{0.75}Ca_{0.25}MnO_3$, silicon carbide, molybdenum silicide, cobalt sulfide, silver, gold, copper, palladium, platinum, and combinations thereof, the particles of the non-carbon electronic conductive additive being of a composition selected to increase electronic conductivity within the solid-state electrode layer and to and from its current collector, the particles of the non-carbon conductive additive are coated on at least one of the particles of a lithium-ion-accepting and lithium-ion-releasing electrode composition and the particles of the oxide solid-state electrolyte composition, and free particles of the non-carbon electronic conductive additives.

2. A solid-state electrode for a lithium-ion battery cell as stated in claim 1 in which each of the solid-state cathode layer and the solid-state anode layer of the lithium-ion battery cell contain a non-carbon-containing, electronic-conductive compound as a component of their respective electrode compositions, each in a proportion for increasing the electronic conductivity of their respective electrode compositions.

3. A solid-state electrode for a lithium-ion battery cell as stated in claim 1 in which the densified prepared mixture of particles contains up to fifty percent by weight of the particles of the non-carbon electronic conductive additive composition and the characterizing dimensions of the particles of the particles of the non-carbon electronic conductive additive composition are five micrometers or smaller.

4. A solid-state electrode for a lithium-ion battery cell as stated in claim 1 in which the composition of the oxide compound solid electrolyte material component of the solid-state electrode layer is substantially the same as the composition of the layer of solid electrolyte material.

5. A solid-state electrode for a lithium-ion battery cell as stated in claim 1 in which the composition of the oxide solid-state electrolyte consists essentially of one or more of the following compounds;
(a) $Li_7La_3Zr_2O_{12}$, $Li_5La_3M_2O_{12}$ (M=Nb or Ta) with garnet-type crystal structures;
(b) $Li_{14}Zn(GeO_4)_4$ and $Li_{3+x}(P_{1-x}Si_x)O_4$;
(c) $Li_{1+x}Al_xGe_{2-x}(PO_4)_3$ (LAGP) and $Li_{1+x}Ti_{2-x}Al_x(PO_4)_3$ (LTAP), $LiTi_{0.5}Zr_{1.5}(PO_4)_3$; and
(d) $Li_{3.3}La_{0.56}TiO_3$, $Li_{3x}La_{2/3-x}TiO_3$, $Li_{0.5}M_{0.5}TiO_3$ (M=Sm, Nd, Pr, and La).

6. A solid-state electrode for a lithium-ion battery cell as stated in claim 1 in which the composition of the solid-state cathode electrode material consists essentially of one or more of the following compounds:
(a) rock salt-type layered oxides including $LiCoO_2$, $LiNi_xMn_yCo_{1-x-y}O_2$, and $LiNi_xMn_{1-x}O_2Li_{1+x}MO_2$;
(b) $LiMn_2O_4$ and $LiNi_xMn_{2-x}O_4$ with spinel-type crystal structures; and
(c) polyanion cathode compounds including $LiV_2(PO_4)_3$ and $LiFeSiO_4$.

7. A solid-state electrode for a lithium-ion battery cell as stated in claim 1 in which the composition of the anode material consists essentially of one or more of the following compounds:
(a) lithium titanium oxide, e.g. $Li_4Ti_5O_{12}$;
(b) Li metal and Li alloys;
(c) Si and silicon-alloys; and
(d) graphite, graphene.

8. A lithium-ion battery cell comprising:
a solid-state cathode layer formed of a thermally-compacted mixture of particles of a lithium-containing and oxygen-containing compound of lithium-ion battery active cathode material and an oxide compound solid electrolyte material, one side of the solid-state cathode layer being attached to a current collector and the second side of the solid-state cathode layer lying against a first side of a layer of oxygen-containing, solid-state electrolyte material;
a solid-state anode layer formed of a thermally-compacted mixture of lithium-ion battery active anode material and an oxide compound solid electrolyte material, one side of the solid-state anode layer being attached to a current collector and the second side of the solid-state anode layer lying against the second side of the layer of oxygen-containing, solid-state electrolyte material,
the layer of solid-state electrolyte material consisting essentially of compacted particles of one or more lithium-containing and oxygen-containing compounds conductive of lithium ions in the operation of the lithium-ion battery cell; and
at last one of the solid-state cathode layer and the solid-state anode layer containing a non-carbon-containing, electronic conductive compound as a component of the compositions of their respective electrode layers in a proportion of the overall electrode composition or compositions for increasing the electronic conductivity of the solid-state cathode layer and/or the solid-state anode layer, wherein the non-carbon-containing, electronic conductive compound is selected from the group consisting of: $Ge_2O_3$, $RuO_2$, $SnO_2$, $Ti_2O_3$, $ZnO$, $YBa_2Cu_3O_7$, $La_{0.75}Ca_{0.25}MnO_3$, silicon carbide, molybdenum silicide, cobalt sulfide, silver, gold, copper, palladium, platinum, and combinations thereof, and wherein the non-carbon-containing, electronic conductive compound is coated on at least one of the particles of a lithium-containing and oxygen-containing compound of lithium-ion battery active cathode material, the lithium-ion battery active anode material, and the oxide compound solid electrolyte material and free particles of the non-carbon-containing, electronic conductive compound is mixed with the particles of a lithium-containing and oygen-containing compound of lithium-ion battery active cathode material, the lithium-ion battery active anode material, and the oxide compound solid electrolyte material and the at least one of the particles of a lithium-containing and oxygen-containing compound of lithium-ion battery active cathode material, the lithium-ion battery active anode material, and the oxide compound solid electrolyte material coated with the non-carbon-containing, electornic conductive compound.

9. A lithium-ion battery cell as stated in claim 8 in which each of the solid-state cathode layer and the solid-state anode layer of the lithium-ion battery cell contain a non-carbon-containing, electronic conductive compound as a component of their respective electrode compositions, each in a proportion for increasing the electronic conductivity of their respective electrode compositions.

10. A lithium-ion battery cell as stated in claim 8 in which only the solid-state cathode layer of the lithium-ion battery cell is formed with a non-carbon-containing, electronic conductive compound as a component of its cathode composition in a proportion of the cathode composition for increasing the electronic conductivity of the solid-state cathode layer.

11. A lithium-ion battery cell as stated in claim 8 in which only the solid-state anode layer of the lithium-ion battery cell is formed with a non-carbon-containing, electronic conductive compound as a component of its anode composition in a proportion of the anode composition for increasing the electronic conductivity of the solid-state anode layer.

12. A lithium-ion battery cell as stated in claim 8 in which the particles of the non-carbon electronic conductive additive composition constitute up to fifty percent-by-weight of the composition of at least one of the anode layer and the cathode layer, and the characterizing dimensions of the particles of the non-carbon electronic conductive additive composition are five micrometers or smaller.

13. A lithium-ion battery cell as stated in claim 8 in which the composition of the oxide compound solid electrolyte material component of each of the solid-state cathode layer and the solid-state anode layer is substantially the same as the composition of the layer of solid electrolyte material.

14. A lithium-ion battery cell as stated in claim 8 in which the composition of the solid-state electrolyte consists essentially of one or more of the following compounds;
 (a) $Li_7La_3Zr_2O_{12}$, $Li_5La_3M_2O_{12}$ (M=Nb or Ta) with garnet-type crystal structures;
 (b) $Li_{14}Zn(GeO_4)_4$ and $Li_{3+x}(P_{1-x}Si_x)O_4$;
 (c) $Li_{1+x}Al_xGe_{2-x}(PO_4)_3$ (LAGP) and $Li_{1+x}Ti_{2-x}Al_x(PO_4)_3$ (LTAP), $LiTi_{0.5}Zr_{1.5}(PO_4)_3$; and
 (d) $Li_{3.3}La_{0.56}TiO_3$, $Li_{3x}La_{2/3-x}TiO_3$, $Li_{0.5}M_{0.5}TiO_3$ (M=Sm, Nd, Pr, and La).

15. A lithium-ion battery cell as stated in claim 8 in which the composition of the cathode material consists essentially of one or more of the following compounds:
 (a) rock salt-type layered oxides including $LiCoO_2$, $LiNi_xMn_yCo_{1-x-y}O_2$, and $LiNi_xMn_{1-x}O_2Li_{1+x}MO_2$;
 (b) $LiMn_2O_4$ and $LiNi_xMn_{2-x}O_4$ with spinel-type crystal structures; and
 (c) polyanion cathode compounds including $LiV_2(PO_4)_3$ and $LiFeSiO_4$.

16. A lithium-ion battery cell as stated in claim 8 in which the composition of the anode material consists essentially of one or more of the following compounds:
 (a) $Li_4Ti_5O_{12}$;
 (b) Li metal and Li alloys;
 (c) Si and Silicon-alloys; and
 (d) Graphite, graphene.

17. A lithium-ion battery cell as stated in claim 16 in which the composition of the anode material includes graphite or graphene and only the solid-state cathode layer of the lithium-ion battery cell is formed with a non-carbon-containing, electronic conductive compound as a component of its cathode composition in a proportion of the cathode composition for increasing the electronic conductivity of the solid-state cathode layer.

* * * * *